United States Patent [19]

Föll et al.

[11] E Re. 29,694

[45] Reissued Jul. 11, 1978

[54] TOOL SUPPORT FOR USE IN MACHINE TOOLS PARTICULARLY IN TURNING MACHINES

[75] Inventors: Gerhard Föll, Esslingen; Heinrich Lahm, Esslingen-Sirnan, both of Germany

[73] Assignee: Index-Werke KG Hahn & Tessky, Stuttgart, Germany

[21] Appl. No.: 738,346

[22] Filed: Nov. 3, 1976

Related U.S. Patent Documents

Reissue of:

[64] Patent No.: 3,846,880
Issued: Nov. 12, 1974
Appl. No.: 411,381
Filed: Oct. 31, 1973

U.S. Applications:

[62] Division of Ser. No. 79,483, Oct. 9, 1970, Pat. No. 3,786,539.

[30] Foreign Application Priority Data

Oct. 16, 1969 [DE] Fed. Rep. of Germany ..... 1952050

[51] Int. Cl.[2] ..... B23B 7/04; B23B 3/18

[52] U.S. Cl. ..... 29/36; 29/39; 82/2 R

[58] Field of Search ..... 29/27 C, 36, 39, 40, 29/43, 44; 408/35; 82/2 R, 36 A

[56] References Cited

U.S. PATENT DOCUMENTS

| | | | |
|---|---|---|---|
| 571,402 | 11/1896 | Schneider | 82/36 A |
| 946,924 | 1/1910 | Thompson | 82/36 A |
| 2,534,333 | 12/1950 | Wyrick | 82/36 A |
| 2,682,698 | 7/1954 | Berthiez | 408/35 X |
| 2,685,122 | 8/1954 | Berthiez | 408/35 X |
| 2,745,306 | 5/1956 | Schmidt | 82/36 A |
| 3,010,348 | 11/1961 | Swanson et al. | 82/36 A |
| 3,316,786 | 5/1957 | Coate | 82/36 |
| 3,443,310 | 5/1969 | Burroughs | 29/568 |
| 3,459,076 | 8/1969 | Kummer | 82/14 |
| 3,486,209 | 12/1969 | Shultz et al. | 29/27 C |
| 3,691,613 | 9/1972 | Walk | 29/27 C |
| 3,750,245 | 8/1973 | Kennedy | 82/36 A |
| 3,918,331 | 11/1975 | Svanstrom | 82/2 R |

FOREIGN PATENT DOCUMENTS

| | | | |
|---|---|---|---|
| 943,131 | 11/1963 | United Kingdom | 29/39 |

OTHER PUBLICATIONS

Vollautomatische Revolverdrehbank, ASR-200, #1579, T/3, 1500, 4, 69, Lidkopings Mekaniska Verkstads Aktiebolag, Lidkoping, Sweden.

*Primary Examiner*—Leonidas Vlachos
*Attorney, Agent, or Firm*—Neuman, Williams, Anderson & Olson

[57] ABSTRACT

A machine tool with a rotary work spindle and a cross-slide having a lower carriage and an upper carriage movable on the lower carriage in a direction normal to the direction of movement of the lower carriage. One of the carriages is movable normal to the axis of the work spindle. A turret is mounted on the upper carriage indexible about an axis located in a plane including the axis of the work spindle. The turret is provided with at least two groups or rows or receiving means for tool holders which are disposed in two parallel planes spaced in direction of the turret axis from each other.

18 Claims, 3 Drawing Figures

TOOL SUPPORT FOR USE IN MACHINE TOOLS PARTICULARLY IN TURNING MACHINES

Matter enclosed in heavy brackets [ ] appears in the original patent but forms no part of this reissue specification; matter printed in italics indicates the additions made by reissue.

CROSS-REFERENCE TO RELATED APPLICATION

The present application is a divisional application of the copending application Ser. No. 749,483 filed Oct. 9, 1970, now U.S. Pat. No. 3,786,539.

BACKGROUND OF THE INVENTION

The present invention relates to machine tools in general, and more particularly to improvements in tool supports for use in turning machines, especially in turning machines of the type wherein the tool support is mounted on a slide and the workpiece is held in a rotary work spindle.

Many types of machine tools are provided with automatic tool changers which exchange tools without any supervision or manipulation by the persons in charge. As a rule, such machines are equipped with a tool magazine and the automatic tool changer or tool changers are designed to transport discrete tools between the magazines and the tool holder of the machine. Each tool changer normally operates in such a way that it transports a fresh tool during movement away from the magazine and returns a previously used tool during travel toward the magazine. Tool magazines and automatic tool changers are desirable and practical in large machine tools and in huge production lines but they are less practical or cannot be used at all in relatively small machine tools, for example, in connection with many types of automatic turning machines. The space requirements of a magazine and tool changer are normally such that these parts cannot be readily installed in, on or adjacent to a relatively small turning machine or an analogous machine tool. Moreover, tool magazines and automatic tool changers are not practical for use in machine tools wherein the tools must be exchanged at frequent intervals because the total time which is taken up for exchange of tools constitutes a substantial percentage of the time during which the machine tool is in actual use. This holds especially true when the tool magazine must be installed at a relatively large distance from the working station so that the tool changer must transport the tools along an elongated path. Still further, when the tools must be exchanged at frequent intervals, the likelihood of penetration of foreign matter into the sockets for tools or tool holders is quite pronounced. If a chip, shaving or another foreign particle happens to enter a socket, the tool holder or the tool which is thereupon inserted into the same socket is not held in an optimum position so that the configuration and/or finish of the workpiece is unsatisfactory. It is well known that drills, turning tools and other types of tools which are used in relatively small automatic turning machines must be interchanged at frequent intervals; consequently, inaccurate finish of workpieces due to penetration of foreign matter into the sockets for such tools of their holders is to be be expected if the sockets remain empty for prolonged periods of time or at frequent intervals. Therefore, all presently utilized automatic turning machines employ reciprocal tool carriages or indexible tool turrets which support holders for several material removing tools. It was also proposed to provide the turret or carriage of a machine tool with two or more rows of sockets for tool holders to thereby increase the overall number of tools which can be held in readiness close to the working station. Such mounting of tool holders in several rows renders it possible to treat a workpiece with two tools in a simultaneous operation, for example, to remove material by means of a turning tool and a borer.

A drawback of the just described machine tools is that the treatment of each type of workpieces necessitates a different setup of tools in the tool support, regardless of whether the tool support constitutes a turret or a carriage. Thus, whenever the machine has completed the treatment of a batch of workpieces and is to treat a batch of different workpieces, the tools in the tool support must be rearranged and/or replaced with different tools. This is due to the fact that, when the tools are mounted in a turret, the latter is merely movable in the axial direction of the work spindle. A tool carriage in presently known machine tools is movable in a direction at right angles to the axis of the work spindle. For example, when the tools are mounted in an indexible turret which is movable only axially of the work spindle, a turning tool which is to remove material from the front end face of a workpiece in the chuck of the work spindle cannot be used in such a machine tool because the turret would be unable to move the turning tool radially of the work spindle.

SUMMARY OF THE INVENTION

An object of the invention is to provide a novel and improved machine tool wherein the tool support can carry a substantial number of tools and tool holders and is mounted in such a way that it contributes significantly to versatility and to the output of the machine tool.

Another object of the invention is to provide a novel and improved tool support for use in turning machines and analogous machine tools wherein a large number of tools can be mounted and held in such a way that the distribution of tools is not dependent on the nature of the workpieces which are to be treated and that each of a large number of tools can be rapidly moved to a requisite position for feeding toward engagement with the workpieces.

A further object of the invention is to provide a tool support which can be mounted on a slide in a machine tool in such a way that it constitutes an inexpensive, compact and lightweight substitute for automatic tool changing systems of presently known design.

An additional object of the invention is to provide a tool support which can be mounted on many presently known machine tools without necessitating appreciable alterations in the design of such machine tools.

A further object of the invention is to provide a tool support wherein the tools and their holders can be conveniently grouped to further facilitate movements of selected tools into engagement with workpieces and to prevent interference by one type of tool when the workpiece is being treated by a tool of another type.

The invention is embodied in a machine tool, particularly in a turning machine, which comprises a frame, a work spindle rotatably mounted in a portion of the frame and having means for holding workpieces which rotate during engagement with tools, a slide including a first carriage which is reciprocably mounted in the frame and a second carriage which is reciprocably mounted on the first carriage, one of the carriages being reciprocable axially of the work spindle and the other carriage being reciprocable radially of the work spindle, and a tool support which is mounted on the second carriage and comprises several groups of sockets or other suitable receiving means for tool holders. The groups preferably form rows of coplanar receiving means and each such group is movable into at least one predetermined plane in which the tools in tool holders supported by the receiving means in the selected group are in an optimum position for engagement with a workpiece in the work spindle.

The tool support comprises a turret mounted on and indexible with respect to the second carriage about a second axis located in a plane including the axis of the work spindle. The turret is provided with at least two groups or rows of receiving means for tool holders which are disposed in two parallel planes spaced in the direction of the second axis from each other.

The novel features which are considered as characteristic for the invention are set forth in particular in the appended claims. The invention itself, however, both as to its construction and its method of operation, together with additional objects and advantages thereof, will be best understood from the following description of specific embodiments when read in conjunction with the accompanying drawing.

DESCRIPTION OF THE PREFERRED EMBODIMENTS

Figure 1:
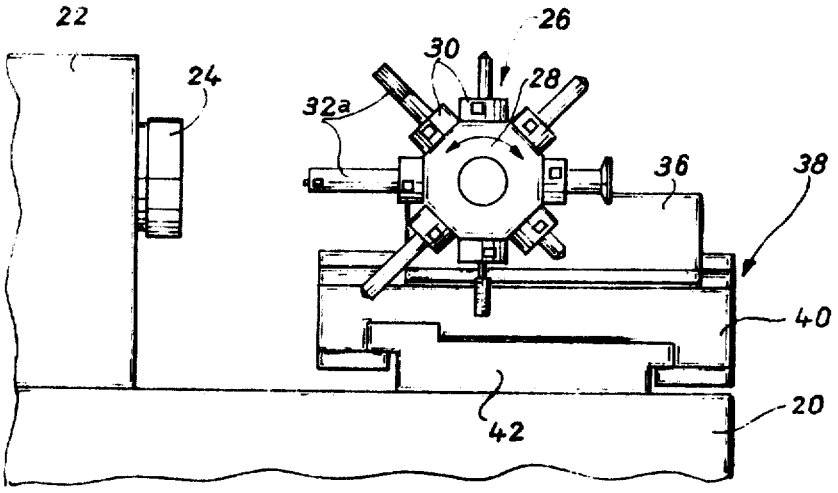
FIG. 1 is a fragmentary side elevational view of a machine tool having a turret-shaped tool support which is constructed and mounted in accordance with the present invention.
Figure 2:
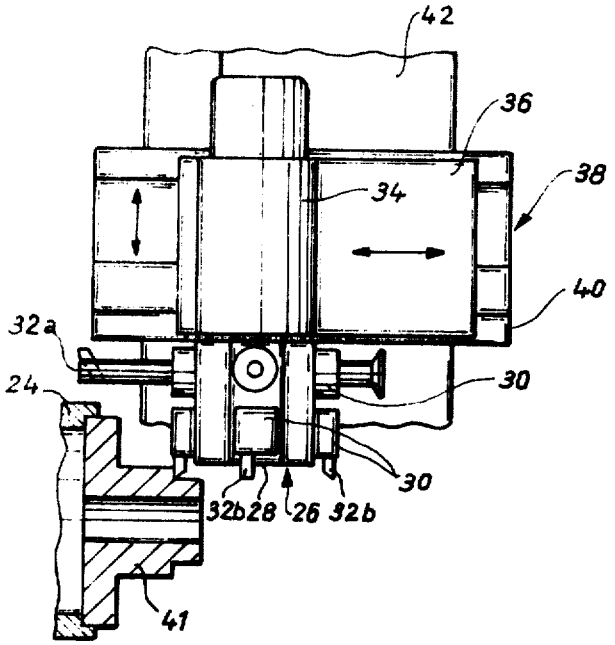
FIG. 2 is a plan view of the structure shown in FIG. 1, further showing a workpiece which is mounted in the work spindle and being treated by one of the tools whose holders are supported by the receiving means of the turret.

FIGS. 1 and 2 illustrate a portion of a machine tool which comprises a frame 20 having a headstock 22 for a rotary work spindle whose chuck is shown at 24. This chuck supports a workpiece 41 which is rotated about a horizontal axis while in engagement with a material removing tool. The frame 20 is further provided with horizontal ways or guide means 42 extending at right angles to the axis of the work spindle and supporting the first or lower carriage 40 of a cross slide 38. The slide 38 further includes an upper or second carriage 36 which is movable along ways provided on the lower carriage 40 and extending in parallelism with the axis of the work spindle. The carriage 36 mounts a tool support 26 here shown as including a single polygonal turret 28 which is indexible about a horizontal axis normal to the axis of the work spindle. The means for indexing the turret 28 forms no part of the present invention. If is further clear that the illustrated octagonal turret 28 can be replaced with a hexagonal, pentagonal, etc., turret without departing from the spirit of the invention.

Each facet of the peripheral surface of the turret 28 is formed with a pair of receiving means in the form of radial sockets (such as the sockets 44 shown in FIG. 3) serving to receive the male portions of tool holders 30 each of which can carry a different material removing tool 32. The sockets of the turret 28 form two groups each of which includes a row or annulus of eight equidistant coplanar sockets so that the turret can support as many as sixteen tools at a time.

The shaft of the turret 28 is mounted in a bearing 34 which is mounted on top of the upper carriage 36. In addition to being indexible about its own axis, the turret 28 is movable axially of the work spindle in response to movement of the upper carriage 36 relative to the lower carriage 40, and radially of the work spindle in response to movement of the lower carriage 40, along the ways 42. This enables the person in charge to place each of the two rows or groups of tool holders 30 into at least one predetermined plane in which the respective tools are in an optimum position for engagement with and for removal of material from the revolving workpiece 41. The tools 32 in the outer row or group of tool holders 30 (i.e., in the lower row, as viewed in FIG. 2) are intended to remove material from the exterior of the workpiece 41. The tools 32a in the inner group or row of tool holders 30 (nearer to the bearing 34) are intended to remove material from the interior of the workpiece 41. The illustrated tools 32*b* in the outer row of tool holders 30 are conventional turning tools whose bits are shown as extending from the respective tool holders.

The aforedescribed mobility of the turret 28 (with reference to the carriage 36, with the carriage 36 relative to the carriage 40, and/or with the carriages 36, 40 relative to the frame 20) renders it possible to employ two or more adjacent tools in any one of the two rows simultaneously wih each other or to employ each tool independently of all other tools (including those which are immediately adjacent to the selected tool). Thus, the improved tool support 26 serves as a convenient, cheaper and more compact substitute for a conventional tool magazine of the type from which the tools can be removed one after the other for delivery to the tool support prior to engagement with a workpiece. An important advantage of the tool support 26 over such tool magazines is that it can operate without tool changers and also that the tools 32 in each of the groups or rows can be distributed at random rather than in a predetermined sequence in dependency on the nature of workpieces as is customary in conventional tool magazines.

In the position shown in FIG. 2, one of the tools 32b in the outer row is in the process of reducing the diameter of the foremost end of the workpiece 41. All of the tools 32b of the outer row are located in a plane in which each of these tools can be indexed into material removing engagement with the workpiece. The selected tool is thereupon fed by moving the upper carriage 36 and the turret 28 with reference to the lower carriage 40 or by moving the carriages 36, 40 and the turret 28 with reference to the ways 42. By moving the carriage 36 to the right, as viewed in FIG. 2, and by thereupon moving the carriages 36, 40 downwardly, as viewed in FIG. 2, the tools 32a of the inner row (nearer to the bearing 34) can be placed into a plane in which a selected tool can be moved into proper position for engagement with the workpiece 41 in response to indexing of the turret 28 by one or more steps. It will be seen that the tools 32 of the outer and inner row need not be distributed in dependency on the nature of workpieces and that any one of these tools can be moved into an appropriate position with reference to the workpiece 41 or any other workpiece which can be properly held by the chuck 24.

It is clear that the movements of the carriages 36, 40 and the indexing of the turret 28 can be controlled by a suitable programming system of any known design. The feature that the tools 32b for external treatment of workpieces are assembled in a second row reduces the likelihood that the tool or tools of one row would interfere with the treatment of a workpiece by one or more tools of the other row, or vice versa. As shown in FIG. 2, the tools 32a of the inner row are sufficiently remote from the tools 32b of the outer row so that they cannot interfere with the operation of the tool which is shown in material removing engagement with the workpiece 41. Analogously, when one of the tools 32a in the inner row is caused to move into material removing engagement with the workpiece 41, the tools 32b of the outer row are out of the way and permit unimpeded internal treatment of the workpiece. The leftmost tool 32a in the inner row of tools shown in FIG. 2 is sufficiently remote from the workpiece 41 and from the chuck 24 to permit removal of material by the tool 32b which is shown in engagement with the workpiece 41 all the way to the outer end face of the chuck as well as all the way to the bore of the workpiece. This is so despite the fact that the diameter of the leftmost part of the workpiece 41 greatly exceeds the diameter of its medium and rightmost parts. If the workpiece 41 is replaced with a smaller diameter workpiece, the likelihood that one of the tools 32a in the inner row would interfere with the operation of a tool 32b in the outer row is even more remote. Thus, the selected tool 32b of the outer row can be moved radially of the chuck 24 all the way to the axis of the smaller-diameter workpiece. If the configuration of a workpiece is such that a tool 32a in the inner row would possibly interfere with the operation of a tool 32a in the outer row, the socket behind the selected tool 32b of the outer row is simply left empty. With reference to FIG. 2, the holder 30 for the leftmost tool 32a of the inner row can be removed while the axially aligned tool 32b of the outer row removes material from the workpiece 41. This enables the tool 32b which engages the workpiece 41 to reduce the latter's diameter to one which only slightly exceeds the diameter of the bore in the workpiece. In the event that the workpiece 41 is replaced with a solid workpiece (without an axial bore), the selected tool 32b of the outer row can remove from such solid workpiece material all the way to the axis of the chuck 24, provided that the associated tool holder of the inner row is temporarily removed from its socket.

Figure 3:
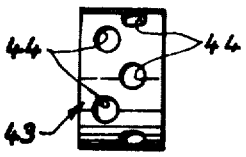
FIG. 3 is a side elevational view of a second turret-shaped tool support.

FIG. 3 illustrates a modified tool support 43 which constitutes a cylindrical turret having a cylindrical peripheral surface provided with two rows or groups of radially extending receiving means in the form of sockets 44 each of which can receive a portion of a tool holder. It will be noted that the sockets 44 of the two rows are staggered with reference to each other, as considered in the circumferential direction of the tool support 43. This renders it possible to place the two rows closer to each other and to thus reduce the axial length of the tool support. This tool support can be used in the machine tool of FIGS. 1 and 2 in place of the polygonal turret 28. The tool support 43 of FIG. 3 is particularly suited for use in relatively small turning machines or analogous machine tools.

The sockets 44 of at least one of the rows of sockets shown in FIG. 3 can be provided with groove-like extensions, or the turret 43 can be provided with tongues extending axially of and into the respective sockets 44. The sockets are then capable of receiving tool holders 30 in such a way that the tool holders are movable radially of the turret 43 but cannot rotate in their sockets. Suitable mechanisms can be provided to effect axial adjustment of tool holders in their sockets. Such types of sockets are particularly suited for reception of holders for tools 32 which are intended to remove material from the exterior of a workpiece. Referring again to FIG. 2, it will be noted that the tools 32b in the outer row of receiving means in the turret 28 extend beyond the front end face of the turret. This is desirable because the front end face of the turret cannot interfere with the feeding of the tools in the outer row toward the workpiece 41.

It will be understood that each of the elements described above, or two or more together, may also find a useful application in other types of machine tools differing from the type described above.

While the invention has been illustrated and described as embodied in a machine tool, especially a turning machine, it is not intended to be limited to the details shown since various modifications and structural changes may be made without departing in any way from the spirit of the present invention.

Without further analysis, the foregoing will so fully reveal the gist of the present invention that others can by applying current knowledge readily adapt it for various applications without omitting features that from the standpoint of prior art fairly constitute essential characteristics of of the generic or specific aspects of this invention and, therefore, such adaptations should and are intended to be comprehended within the meaning and range of equivalence of the following claims.

What is claimed as new and desired to be protected by Letters Patent is set forth in the appended claims:

[1. In a machine tool, a combination comprising a frame; a work spindle for carrying a workpiece to be machined, said work spindle being mounted on said frame rotatable about a first axis; a slide including a first carriage reciprocably mounted on said frame and a second carriage mounted on said first carriage, one of said carriages being reciprocably substantially axially and the other substantially radially of said work spindle; and tool support means mounted on said second carriage and comprising a turret indexible with respect to the second carriage only about a second axis located in a plane including said first axis, said turret being provided with at least two rows of receiving means for tool holders, said rows being arranged about said second axis coaxial therewith, said coaxial rows of receiving means being spaced from each other in the direction of movement of one of said carriages.]

[2. A combination as defined in claim 1, wherein said rows of receiving means are circular rows.]

[3. A combination as defined in claim 1, wherein said receiving means for tool holders are arranged in at least two groups of receiving means disposed in two parallel planes spaced in the direction of said second axis from each other.]

4. [A combination as defined in claim 3, and] *In a machine tool, a combination comprising a frame; a work spindle for carrying a workpiece to be machined, said work spindle being mounted on said frame rotatable about a first axis; a slide including a first carriage reciprocably mounted on said frame and a second carriage mounted on said first carriage, one of said carriages being reciprocable*

*substantially axially and the other substantially radially of said work spindle; and tool support means mounted on said second carriage and comprising a turret indexible with respect to the second carriage only about a second axis located in a plane including said first axis, said turret being provided with at least two rows of receiving means for tool holders, said receiving means being arranged in at least two groups disposed in two parallel planes spaced in the direction of said second axis from each other, said rows being arranged about said second axis coaxial therewith, said coaxial rows of receiving means being spaced from each other in the direction of movement of one of said carriages said combination also* including a plurality of tool holders respectively mounted on said receiving means and a tool in each of said tool holders, the tools in the tool holders of one of said groups of receiving means extending substantially in the direction of said second axis and being adapted to remove material from the exterior of a workpiece carried by said work spindle and the tools in the tool holders of the other of said groups extending in a direction substantially normal to said second axis and being adapted to remove material from the interior of the workpiece.

[5. A combination as defined in claim 3, wherein said second axis extends normal to said first axis.]

6. [A combination as defined in claim 3,] *In a machine tool, a combination comprising a frame; a work spindle for carrying a workpiece to be machined, said work spindle being mounted on said frame rotatable about a first axis; a slide including a first carriage reciprocably mounted on said frame and a second carriage mounted on said first carriage,* wherein said second carriage is movable in the direction of said first axis *and said first carriage is movable in a direction transverse to said first axis; and tool support means mounted on said second carriage and comprising a turret indexible with respect to the second carriage only about a second axis located in a plane including said first axis, said turret being provided with at least two rows of receiving means for tool holders, said receiving means being arranged in at least two groups disposed in two parallel planes spaced in the direction of said second axis from each other, said rows being arranged about said second axis coaxial therewith, said coaxial rows of receiving means being spaced from each other in the direction of movement of one of said carriages said combination also including a plurality of tool holders respectively mounted in said receiving means and a tool in each of said tool holders, the tools in the tool holders of one of said groups of receiving means extending substantially in the direction of said second axis and being adapted to remove material from the exterior of a workpiece carried by said work spindle and the tools in the tool holders of the other of said groups extending in a direction substantially normal to said second axis and being adapted to remove material from the interior of the workpiece.*

7. [A combination as defined in claim 5,] *In a machine idol, a combination comprising a frame; a work spindle for carrying a workpiece to be machined, said work spindle being mounted on said frame rotatable about a first axis; a slide including a first carriage reciprocably mounted on said frame and a second carriage mounted on said first carriage, wherein said second carriage is movable in the direction of said first axis and said first carriage is movable in a direction transverse to said first axis; and tool support means mounted on said second carriage and comprising a turret indexible with respect to the second carriage only about a second axis located in a plane including said first axis, said turret being provided with at least two rows of receiving means for tool holders, said receiving means being arranged in at least two groups disposed in two parallel planes spaced in the direction of said second axis from each other, said rows being arranged about said second axis coaxial therewith, said coaxial rows of receiving means being spaced from each other in the direction of movement of one of said carriages said combination also including a plurality of tool holders respectively mounted in said receiving means and a tool in each of said tool holders, the tools in the tool holders of one of said groups of receiving means extending substantially in the direction of said second axis and being adapted to remove material from the exterior of a workpiece carried by said work spindle and the tools in the tool holders of the other of said groups extending in a direction substantially normal to said second axis and being adapted to remove material from the interior of the workpiece and wherein said second axis extends normal to said first axis and* wherein said second carriage is movable in the direction of said first axis.

[8. A combination as defined in claim 3, wherein said receiving means in said two groups are staggered with respect to each other in the circumferential direction of the turret.]

*9. In a machine tool for use with a plurality of removable tools wherein a selected one of said tools is located at a work position and is capable of being moved into working engagement with a rotating workpiece, a combination comprising: a frame; a work spindle mounted on said frame for carrying the workpiece and means rotating the spindle and the workpiece about a first axis; a slide including a first carriage reciprocably mounted on said frame and a second carriage reciprocably mounted on said first carriage, means reciprocating one carriage substantially axially of said first axis and means reciprocating the other carriage along a transverse axis generally parallel to a radial of said first axis; mounting means on said second carriage; a turret extending from said mounting means and indexible relative thereto about a second axis to a plurality of fixed positions each representing a work position for a tool; said turret having a first annulus portion spaced from said mounting means, concentric with said second axis and defining a plurality of circumferentially spaced receiving means in said first annulus portion for a predetermined number of first removable tools and a second annulus portion between said mounting means and said first annulus portion, concentric with the latter and defining a plurality of circumferentially spaced receiving means in said second annulus portion for a predetermined number of second removable tools; said carriages being respectively movable along said first axis and along said transverse axis and selectively positioning a predetermined receiving means of one annulus portion to where a tool received therein is in working engagement with the workpiece, said turret being movable in the direction defined by the spacing between said annulus portions to selectively position either annulus portion to where a predetermined receiving means thereof is in a tool working engagement position, said first and second annulus portions being spaced apart to permit the mounting of tools in all receiving means, any selected receiving means of either annulus portion when in said tool working engagement position being spaced closer to said first axis than all receiving means of the other annulus portion and the tools thereof.*

*10. A combination as defined in claim 9 wherein the receiving means lie in rows which define parallel planes, said planes being normal to the second axis.*

*11. A machine tool as defined in claim 9 including tools mounted in at least two receiving means, a first tool in one*

*of said receiving means having a first workpiece-engaging portion axially spaced from the mounting of said turret in said second carriage and positioned to remove material from the external surface of the workpiece and a second tool in a second receiving means having a workpiece-engaging portion axially located between said mounting and said first workpiece-engaging portion to remove material from the interior of said workpiece, said workpiece-engaging portions being sufficiently spaced apart to avoid interference with said workpiece.*

*12. The machine tool of claim 11 wherein said tools are fixed in said receiving means during removal of material from the rotating workpiece by either of said tools.*

*13. The machine tool of claim 9 including a drive means for rotating and indexing said turret and drive means for rotating said spindle.*

*14. The machine tool of claim 13 including a plurality of tool holders mounted in said receiving means of said first annulus portion and of said second annulus portion, a tool holder mounted in a first receiving means in the first annulus being adapted only when disposed in the work position and moved by said first and second carriages to support a tool for removing material from the exterior of the workpiece rotated about the first axis, and a second tool holder mounted in a second receiving means in said second annulus, said second tool holder being adapted, only when disposed in the work position and moved by said first and second carriages, to support a tool for removal of material from the interior of the workpiece rotating about said first axis.*

*15. The machine tool of claim 13 including a plurality of tool holders mounted in said receiving means and tools for said tool holders, a first tool in one tool holder mounted in a first receiving means in the first annulus and being adapted only when disposed in the work position to be moved along said first axis and along said transverse axis to remove material from the exterior of the workpiece rotating about the first axis, and a second tool in a second tool holder mounted in a second receiving means in said second annulus, said second tool being adapted only when disposed in a work position to be moved along said first axis and along said transverse axis to remove material from the interior of the workpiece rotating about said first axis.*

*16. The machine tool of claim 15 wherein tools are mounted in the receiving means of said first annulus and said second annulus and have workpiece engaging portions, the workpiece engaging portions associated with said first annulus being spaced both axially and radially along the second axis from the workpiece engaging portions of said second annulus sufficiently to avoid interference between the spindle and workpiece and the workpiece engaging portions of tools not in the workpiece engaging position when one of said tools is in said workpiece engaging position.*

*17. The machine tool of claim 9 with tool means mounted in said receiving means, said tool means mounted in said second annulus extending therefrom generally in the direction of said first axis when in the work position and adapted to remove material from the interior of the workpiece, said tool means mounted in the receiving means of the first annulus extending generally transverse to the first axis when in the work position and being adapted to remove material from the exterior of the workpiece.*

*18. A machine tool as defined in claim 9 wherein the tool receiving means in said first annulus portion are located to support tools to remove material from the external surface of the workpiece and the tool receiving means in said second annulus portion are located to support tools to remove material from the interior of the workpiece rotating about said first axis.*

*19. A machine tool as defined in claim 9 wherein the tool receiving means in said first annulus portion comprise an outer group spaced from said mounting in said second carriage and the tool receiving means in said second annulus portion comprise an inner group located between said mounting in said second carriage and said outer group, the tool receiving means in said first annulus portion are located to support tools to remove material from the external surface of the workpiece and the tool receiving means in said second annulus portion are located to support tools to remove material from the interior of the workpiece rotating about said first axis.*

*20. A combination as defined in claim 9 and including a plurality of tool holders mounted in said receiving means and tools mounted in said tool holders, the tools disposed in said first annulus portion being tools for removing material from the interior of the workpiece and the tools disposed in said second annulus being tools for removing material from the interior of the workpiece.*

*21. A combination as defined in claim 9 including a plurality of tools supported in said receiving means and extending outwardly therefrom, each tool supported in a receiving means of said first annulus portion extending substantially radially toward said first axis when in said work position, and each tool supported in a receiving means in said second annulus portion extending substantially parallel to said first axis when in said work position.*

*22. In a machine tool for use with a plurality of removable tools wherein a selected one of said tools is located at a work position and is capable of being moved into working engagement with a rotating workpiece, a combination comprising a frame; a work spindle mounted on said frame for carrying the workpiece and means rotating the spindle and the workpiece about a first axis; a slide including a first carriage reciprocably mounted on said frame, and a second carriage reciprocably mounted on said first carriage, means reciprocating one carriage substantially axially of said first axis and means reciprocating the other carriage along a transverse axis generally radially of said first axis; and tool support means including mounting means on said second carriage and a turret extending from said mounting means and indexible relative thereto only about a second axis substantially radially of said first axis, said turret having a first annulus portion concentric with said second axis and defining a plurality of circumferentially spaced receiving means for a predetermined number of first removable tools and a second annulus portion between said mounting means and said first annulus portion and concentric with the latter, said second annulus portion defining a plurality of circumferentially spaced receiving means for a predetermined number of second removable tools, a plurality of first tools in said first annulus portion extending generally parallel to said second axis for performing exterior operations on said workpiece and a plurality of second tools in said second annulus portion extending generally radially of said second axis to operate on the interior of said workpiece, said turret being indexible about said second axis to selectively locate a receiving means whereby the tool thereof is disposed in a work position and said carriages being respectively movable along said first axis and along said transverse axis to bring a selected annulus portion to a work engaging position where the tool of the selected receiving means is in working engagement with the workpiece, said turret being movable in the direction defined by the spacing between said annulus portions to move from a work engagement position of one annulus*

*portion to a work engagement position of the other annulus portion.*

*23. In a machine tool for removing material from a workpiece, a combination comprising: a frame; a work spindle mounted on said frame for carrying the workpiece and means rotating the spindle and the workpiece about a first axis; a slide including a first carriage reciprocably mounted on said frame and a second carriage reciprocably mounted on said first carriage, means reciprocating one carriage substantially axially of said first axis and means reciprocating the other carriage along a transverse axis generally parallel to a radial of said first axis; mounting means on said second carriage; a turret extending from said mounting means and indexible relative thereto about a second axis to a plurality of fixed positions; said turret having a first annulus portion spaced from said mounting means, concentric with said second axis and defining a plurality of circumferentially spaced first receiving means in said first annulus portion and a second annulus portion between said mounting means and said first annulus portion, concentric with the latter and defining a plurality of circumferentially spaced second receiving means in said second annulus portion; a plurality of first removable tools each having a mounting portion secured in one of said first receiving means and a material removing portion; a plurality of second removable tools, each having a mounting portion secured in one of said second receiving means and a material removing portion; each removable tool being selectively brought into a work position when said turret is indexed to a predetermined one of said fixed positions, said carriages being respectively movable along said first axis and along said transverse axis to selectively bring a selected annulus portion to a work engagement position where the material removing portion of a tool in the work position is in working engagement with the workpiece, said first tools being designed for removal of exterior material from the workpiece, said second tools being designed for removal of interior material from said workpiece, one of said first tools in said work position extending from said turret generally radially to said first axis and one of said second tools in said work position extending from said turret generally parallel to said first axis, said turret being movable in the direction defined by the spacing between said annulus portions to move from a work engagement position of one annulus portion to a work engagement position of the other annulus portion.*

* * * * *

UNITED STATES PATENT AND TRADEMARK OFFICE

CERTIFICATE OF CORRECTION

PATENT NO. : Re. 29,694

DATED : July 11, 1978

INVENTOR(S) : Gerhard Foll and Heinrich Lahm

It is certified that error appears in the above-identified patent and that said Letters Patent are hereby corrected as shown below:

Item 75, Inventors: "Esslingen-Sirnan" should be --Esslingen-Sirnau--.

Item 73, Assignee: "Index-Werke KG Hahn & Tessky, Stuttgart, Germany" should be --Index-Werke KG Hahn & Tessky, Esslingen, Germany--.

Column 1, line 15, "749,483" should be --79,483--

Column 3, line 62, "If" should be --It--.

Column 4, line 33, "wih" should be --with--.

Column 6, line 32, "of of" should be --of--.

Claim 4, column 7, line 14, "on" should be --in--.

Claim 7, line 57, "idol" should be --tool--.

Signed and Sealed this

*Thirteenth* Day of *February 1979*

[SEAL]

*Attest:*

RUTH C. MASON
*Attesting Officer*

DONALD W. BANNER
*Commissioner of Patents and Trademarks*